(12) United States Patent
Baculy

(10) Patent No.: US 6,698,476 B2
(45) Date of Patent: Mar. 2, 2004

(54) WOODWORKING APPARATUS

(76) Inventor: Eric J. Baculy, 7292-15 Mile Rd., Cedar Springs, MI (US) 49319

( * ) Notice: Subject to any disclaimer, the term of this patent is extended or adjusted under 35 U.S.C. 154(b) by 0 days.

(21) Appl. No.: 10/234,350

(22) Filed: Sep. 4, 2002

(65) Prior Publication Data

US 2003/0047239 A1 Mar. 13, 2003

Related U.S. Application Data

(60) Provisional application No. 60/318,025, filed on Sep. 7, 2001.

(51) Int. Cl.$^7$ ................................................. B27C 5/00
(52) U.S. Cl. .................... 144/145.1; 144/2.1; 144/137; 144/203; 144/204.2; 83/409; 83/413
(58) Field of Search .......................... 82/118, 119, 152, 82/155; 83/409, 408, 413; 142/1, 7, 11, 26, 33, 37; 144/1.1, 2.1, 137, 138, 145.1, 144.1, 149, 198.1, 203, 204, 204.2; 409/87, 88, 93, 111, 103, 121

(56) References Cited

U.S. PATENT DOCUMENTS

| | | |
|---|---|---|
| 259,551 A | 6/1882 | Kester |
| 2,347,374 A | 4/1944 | Stahler |
| 2,715,924 A | 8/1955 | Norris |
| 2,822,836 A | 2/1958 | Horstmann et al. |
| 2,918,953 A | 12/1959 | Wraight |
| 3,952,621 A | 4/1976 | Chambos |
| 4,248,282 A * | 2/1981 | Waldron et al. ......... 144/144.1 |
| 4,275,777 A | 6/1981 | Briggs |
| 4,538,654 A | 9/1985 | Nickoloff |
| 4,627,772 A | 12/1986 | Petersen |
| 5,009,255 A | 4/1991 | Fournel |
| 5,020,578 A | 6/1991 | Jennings |
| 5,065,802 A | 11/1991 | Peterson |
| 5,443,103 A * | 8/1995 | Kopacz et al. ............... 144/3.1 |
| 5,597,023 A | 1/1997 | Heintzeman |
| 5,655,583 A | 8/1997 | Heintzeman |
| 6,145,554 A * | 11/2000 | Hightower ................... 142/37 |

* cited by examiner

Primary Examiner—W. Donald Bray
(74) Attorney, Agent, or Firm—Price, Heneveld, Cooper, DeWitt & Litton

(57) ABSTRACT

An apparatus includes a structure supporting a circular blade, a carriage on the structure for linear movement relative to the blade, and a lathe mounted on the carriage, the lathe rotatably supporting a workpiece in proximity to the blade. In one aspect, the support structure is pivotally connected to the carriage to allow pivoting of the lathe between an orientation for engagement of the workpiece with the blade and an orientation in which the workpiece is supported remote from the blade to facilitate operations on the workpiece with a tool implement other than the blade. In another aspect, the support plate is moveable with respect to the carriage in a direction orthogonal to a line parallel with the direction of allowed movement of the carriage relative to the frame, and a pattern plate is mounted to the support plate to control workpiece depth of cut.

9 Claims, 6 Drawing Sheets

WOODWORKING APPARATUS

CROSS-REFERENCE TO RELATED APPLICATION

This application claims priority under 35 U.S.C. §119(e) on U.S. Provisional Application No. 60/318,025 entitled WOODWORKING APPARATUS, filed Sep. 7, 2001, the entire disclosure of which is incorporated herein by reference.

FIELD OF THE INVENTION

This invention relates to tools and machines used in woodworking, and in particular to a lathe assembly that is adaptable for use with a circular saw and/or a router.

BACKGROUND OF THE INVENTION

In the field of woodworking, various machines have been generally required to perform separate functions needed for the fabrication of articles such as furniture components. For example, in order to fabricate a table leg having a circular cross section with longitudinal flutes recessed into the outer surface of the table leg, several machines are typically required. Woodstock having a square cross section is first cut to a desired length such as with a table saw. Thereafter, the workpiece which has been cut to a desired length is placed on a lathe and rotated around its longitudinal axis while being engaged by a cutting or abrading tool which shapes the workpiece so that it has a desired circular cross section. Thereafter, the flutes are recessed into the workpiece by removing it from the lathe, remounting it on a fixture, and utilizing a router with a rotating abrasive burr. Thus, a woodworker will typically utilize three different machines which are each dedicated to performing a single function in order to fabricate a single component such as a fluted, circular table leg.

There are many woodworkers, particularly those that engage in woodworking as a hobby, that desire machines capable of performing cutting, lathing, and routing, but are discouraged from obtaining a dedicated table saw, lathe and router apparatus, because of the cost and/or the space needed for such equipment. Accordingly, apparatuses for converting a woodworking machine dedicated to performing a single function into a machine capable of performing two or more functions would be highly desirable.

U.S. Pat. No. 5,065,802 to Peterson discloses a dado lathe for use with a table saw. The dado lathe device includes a pair of parallel, spaced apart guide rails upon which a frame is slidably mounted. The frame includes vertically and longitudinally adjustable headstock and tailstock spindles for rotatably supporting the woodstock. A drive system selectively rotates the woodstock while moving the frame longitudinally along the guide rails. The dado lathe device is releasably secured to the table saw such as with C-clamps. Thus, a disadvantage with this device is that securement of the device to a table saw is cumbersome and may lack adequate rigidity and stability during the lathing operation. Because the disclosed dado lathe device is designed to hold a workpiece in a parellelpiped shaped framework, mounting and demounting of the workpiece can be ackward and cumbersome. Also, the cage-like frame is not easily adaptable for use with a conventional handheld lathing tool. Further, the disclosed dado lathe device is not easily adaptable for use with other woodworking tools, such as a router.

SUMMARY OF THE INVENTION

In one aspect, the invention provides a woodworking apparatus including a structure for supporting a circular saw blade, a carriage mounted on the structure for linear movement relative to the blade, a support pivotally connected to the carriage to facilitate pivoting of the support with respect to the carriage, and a lathe mounted on the support. The apparatus allows pivoting of the lathe between a first orientation in which a workpiece supported on the lathe is remote from the blade to facilitate operations on the workpiece with a tool implement other than the blade and a second orientation in which a workpiece supported on the lathe is in proximity to the blade to facilitate operations on the workpiece with the blade. The carriage, support and lathe may be permanently mounted on the structure to provide a dedicated lathe which allows lathing operations to be performed with a circular saw blade or with a handheld tool as desired. Alternatively, the carriage, support and lathe may be sold as a kit that facilitates reversible conversion of a conventional table saw into a lathing apparatus.

In another aspect of the invention, there is provided a woodworking apparatus including a structure supporting a circular saw blade, a carriage mounted on the structure for linear movement relative to the blade, a support mounted on the carriage in a manner to allow linear movement of the support relative to the carriage in a direction that is orthogonal to a line parallel with the direction of allowed movement of the carriage relative to the frame, a lathe mounted on the support, a pattern releasably mounted on the support, and a follower mounted on the structure and configured to engage a cam surface on the pattern. The apparatus effects linear movement of the support and lathe relative to the carriage and saw blade as the carriage is moved with respect to the structure, the magnitude and direction of the movement of the carriage and the lathe with respect to the structure being determined by the cam surface of the pattern.

In another aspect of the invention, there is provided a woodworking apparatus including a base, a lathe mounted on the base, and a router platen supported above the lathe. The router platen includes an upper surface for supporting a router and an elongate slot through which a router tool may project to a workpiece supportable on the lathe. The apparatus facilitates routing of a workpiece mounted on the lathe.

These and other features, advantages and objects of the present invention will be further understood and appreciated by those skilled in the art by reference to the following specification, claims and appended drawings.

DESCRIPTION OF THE PREFERRED EMBODIMENTS

Figure 1:
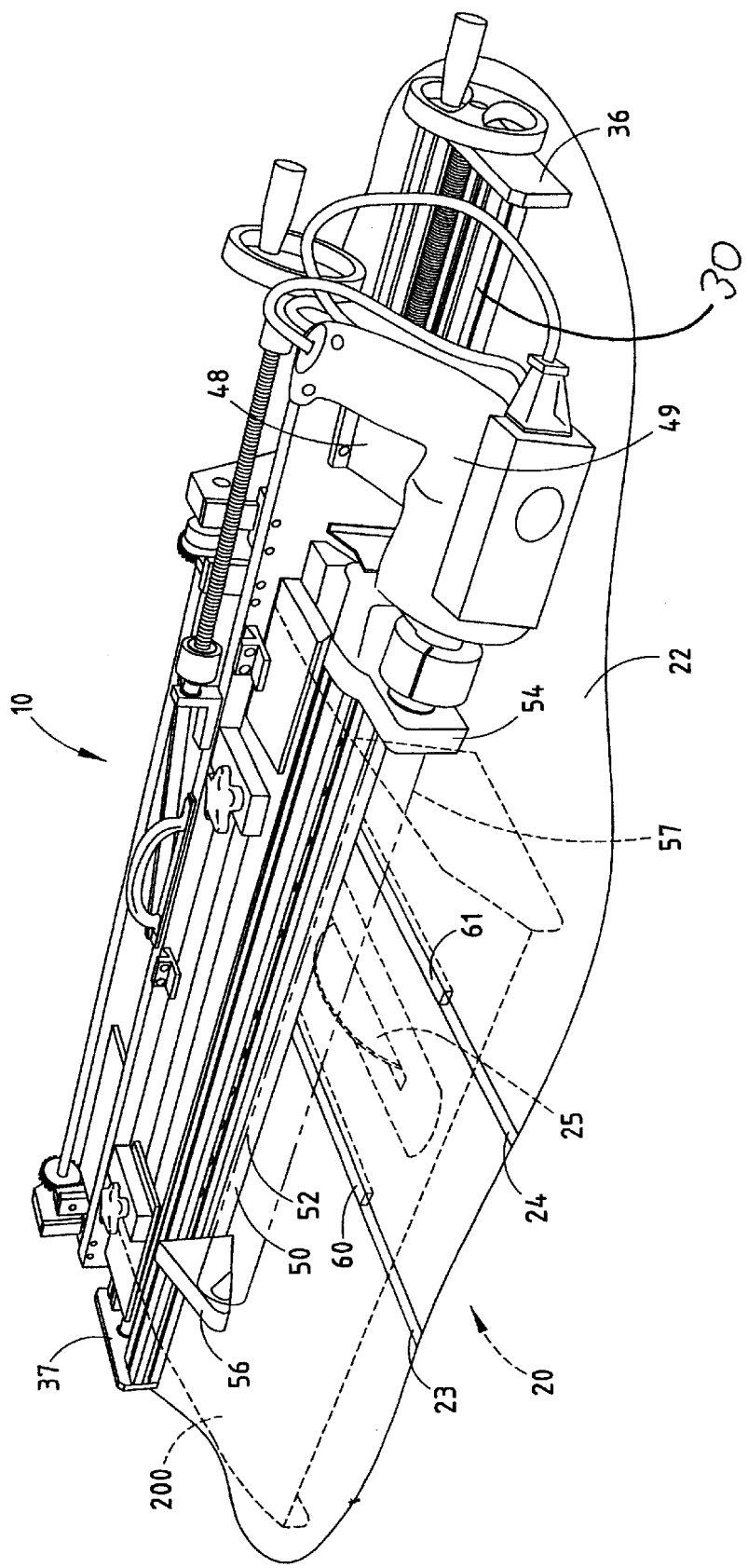
FIG. 1 is a front perspective view of a woodworking apparatus.

In FIG. 1, there is shown a side elevational view of a woodworking apparatus 10 mounted on a table saw 20. The table saw includes a top surface 22 which defines a pair of parallel miter grooves 23 and 24. The table saw supports a circular saw having a blade 25 fixed to a rotatable arbor 26. Arbor 26 is driven by an electric motor (not shown). An upper portion of blade 25 projects through a slot in the top of table 20 beyond surface 22.

Figure 2:
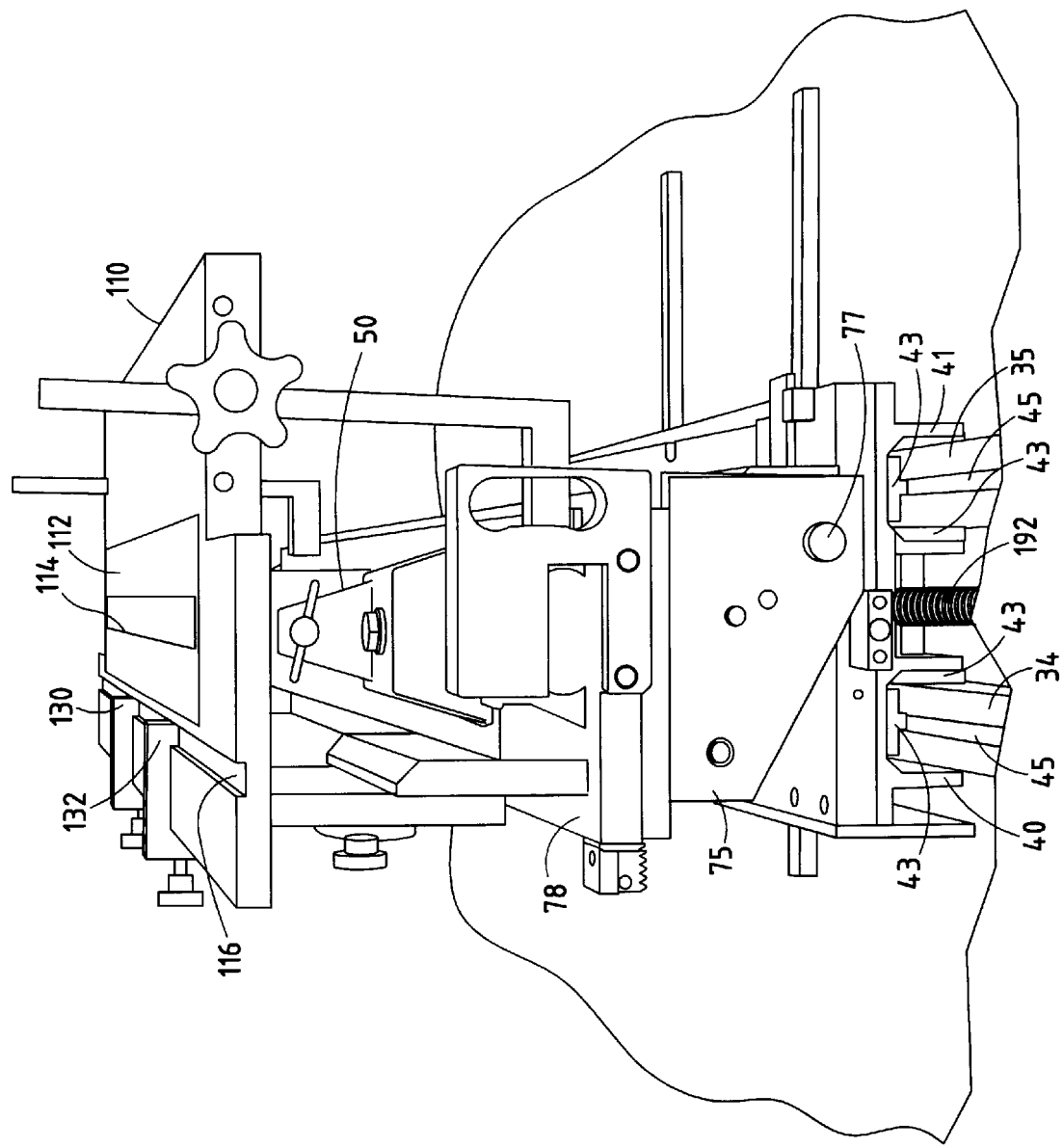
FIG. 2 is a side perspective view of the woodworking apparatus shown in FIG. 1.

The woodworking apparatus 10 includes a frame 30, and a carriage 32 mounted on frame 30 to allow linear movement of the carriage relative to the frame. Frame 30 generally comprises a pair of laterally spaced apart rails 34 and 35 connected at their opposite ends to end plates 36 and 37. Carriage 32 includes guide members 40 and 41 (FIG. 2) having a generally inverted U-shape which wraps around rails 34 and 35. Guides 40 and 41 include slide shoes 43 that engage the tops and sides of rails 34 and 35. Each of the slide shoes 43 includes a tongue which projects into a channel 45 defined in the top and sides of rails 34 and 35. This arrangement allows carriage 32 to move linearly along the longitudinal direction of rails 34 and 35, and provides restraint against movement of carriage 32 with respect to frame 30 in any other direction.

In the illustrated embodiment carriage 32 is moved relative to frame 30 by turning hand wheel 190 to rotate screw 192 journaled at opposite ends in end plates 36 and 37. Screw 192 operates on a nut (not shown) attached to carriage 32.

A lathe 50 is mounted on carriage 32. Lathe 50 comprises a bed 52, a headstock 54, and a tailstock 56. Headstock 54 and tailstock 56 together support a workpiece or spindle 57. A suitable lathe 50 is commercially available under the name "Jorgensen®" from the Adjustable Clamp Company, Chicago, Ill. As is conventional, the position of headstock 54 and/or tailstock 56 on bed 52 is adjustable to accommodate various lengths of woodstock. Also mounted on carriage 32 is a drill stand assembly 48 onto which a drill 49 may be releasably secured and coupled to headstock 54, whereby a workpiece 57 mounted between headstock 54 and tailstock 56 may be rotated. Alternatively, drill stand assembly 48 and drill 49 may be replaced with a dedicated lathe driver, such as an electric motor.

Mounted on the underside of frame 30 are a pair of rails 60 and 61 configured to be received in spaced apart miter slots 23 and 24 defined in the top surface 22 of table saw 20. Suitable mounting rails 60, 61 are commercially available, such as under the name Incra® Miter Slider™ from Taylor Design Group, Inc., Dallas, Tex. (described in U.S. Pat. No. 5,275,074 which is hereby incorporated in its entirety herein). These commercially available mounting rails are provided with adjustment means responsive to adjustment of an adjustment screw for imparting horizontal force to a predetermined portion of the sides of the rails to expand the rails outwardly, thereby forcibly engaging sidewalls of miter grooves 23 and 24 to securely fix the woodworking apparatus 10 to table saw 20. The location of the rails 60 can be adjusted for any particular table saw i.e., rails 60 may be repositioned on frame 30 as desired. Alternatively, the rails 34, 35 and carriage 32 may be permanently mounted to the table top 22 to provide a dedicated lathing apparatus utilizing a power saw for lathing operations.

Figure 3:
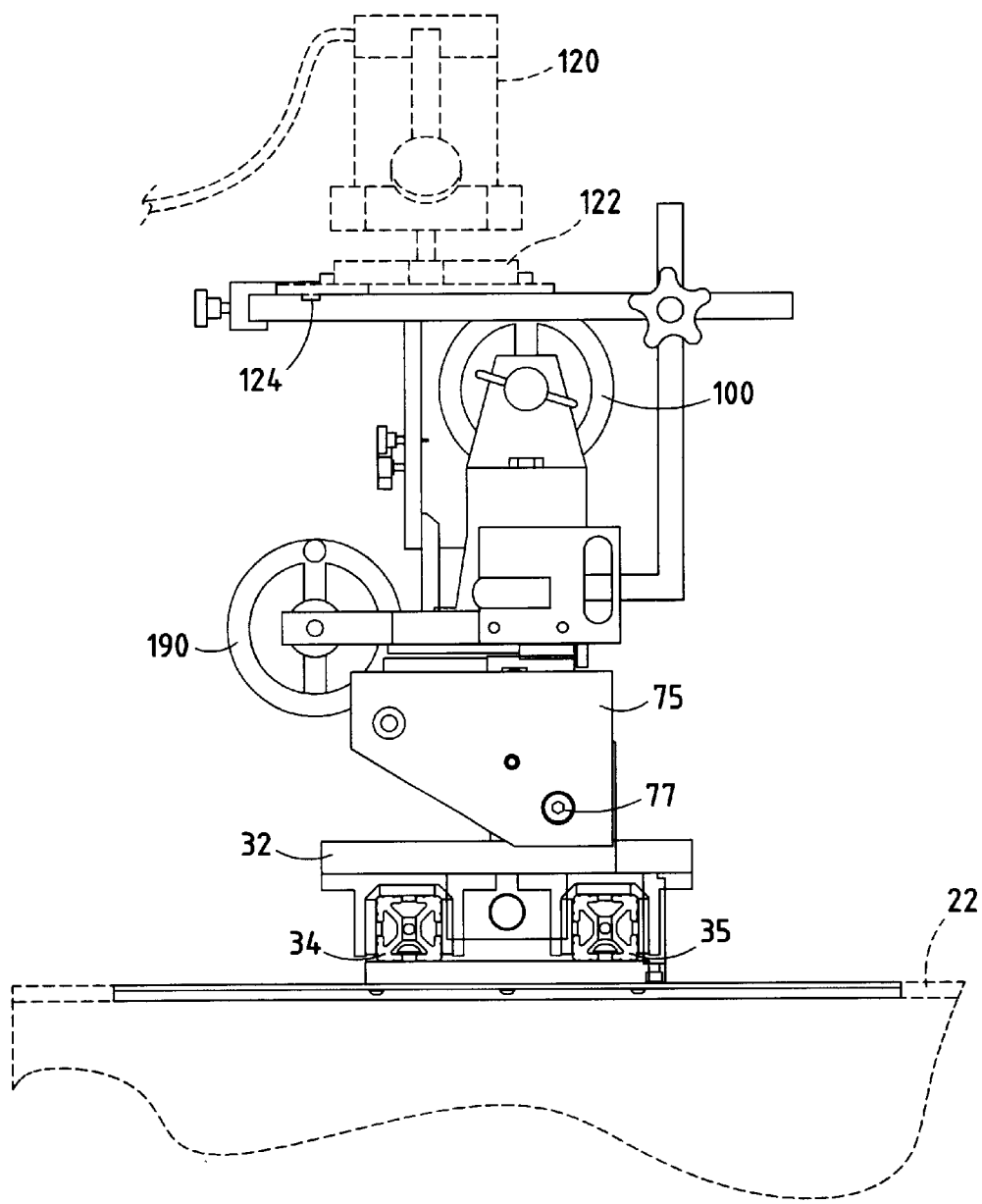
FIG. 3 is an end view of the apparatus shown in FIGS. 1 and 2, with an end plate removed to show certain details.
Figure 4:
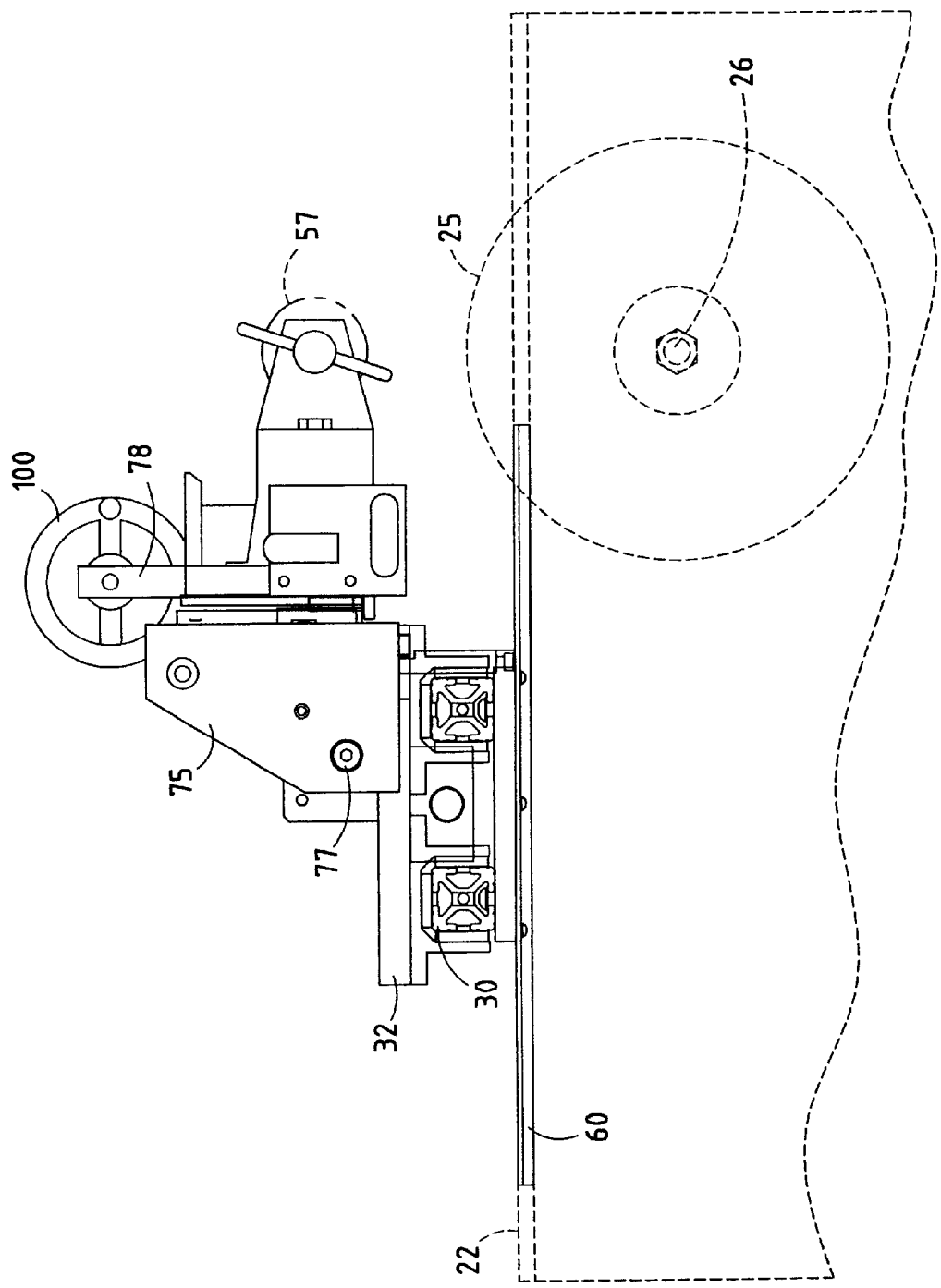
FIG. 4 is another end view of the apparatus shown in FIGS. 1–3, with a lathe support structure rotated 90 degrees with respect to its orientation in FIG. 3.
Figure 5:
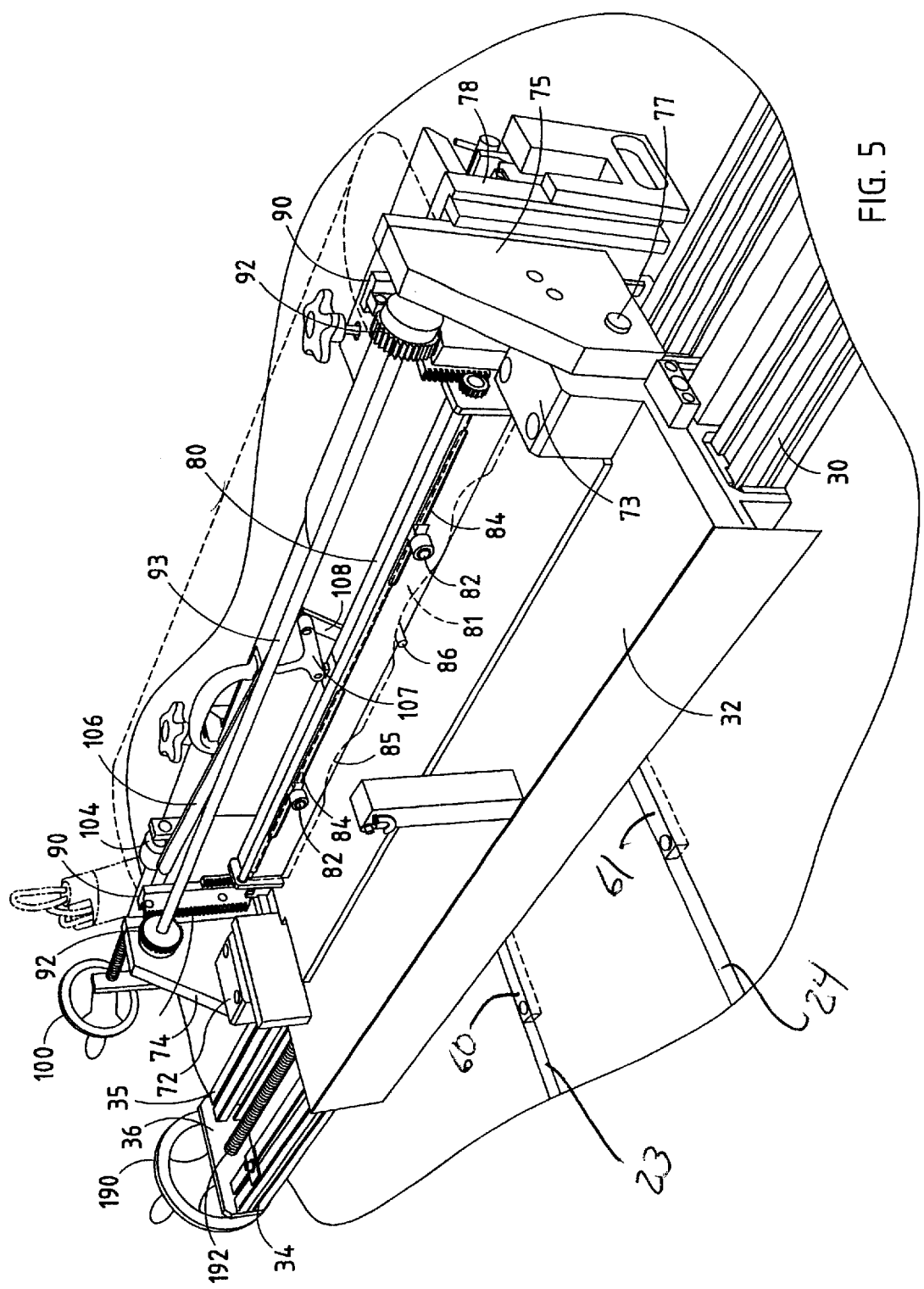
FIG. 5 is another perspective view of the apparatus shown in FIGS. 1–4, similar to FIG. 1, but from another angle and showing additional details.

As can be seen by comparing FIGS. 3 and 4, lathe bed 52 is mounted on a support plate 78 which is in turn mounted on carriage 32 in a manner that allows pivotal movement of support plate 78 relative to carriage 32 around an axis that is parallel with the direction of allowed linear movement of the carriage relative to the frame. As shown in FIG. 3, the support structure may be pivoted into a first orientation in which a workpiece is supportable above the carriage to facilitate operations on the workpiece remote from the table saw blade. Such operations include sanding, mounting and demounting of a workpiece, and lathing operations using a handheld tool. As shown in FIG. 4, the support plate 78 may be pivoted 90 degrees into a second position in which the workpiece may be supported laterally of carriage 32 and in proximity to saw blade 25 for lathing of a workpiece with the saw blade. Fixed on opposite ends of carriage 32 are stanchions 72 and 73 (FIG. 5) to which end plates 74 and 75, respectively, are pivotally attached with pivot pins 77 (only one of which is shown in the drawings). End plates 74 and 75 are fixed to support plate 78 on which lathe 50 is mounted.

Again referring to FIG. 5, the woodworking apparatus 10 in accordance with another aspect of this invention is useable in combination with a table saw to produce lathed articles having generally any desired longitudinal profile in accordance with a pattern. A pattern holding plate 80 secured to support plate 78 is used to releasably support a pattern 81. Pattern 81 is retained on pattern holding plate 80 by quick-release, knobbed threaded fasteners 82 that pass through slots 84 in pattern holding plate 80. The lower edge of pattern 81 defines a cam surface 85 that engages a follower 86 attached to frame 30 (for example, on rail 34). Support plate 78 is mounted on carriage 32 to allow linear movement of support plate 78 relative to carriage 32 in a direction that is orthogonal to a line parallel with the direction of allowed movement of the carriage relative to the frame. For example, when the support plate 78 is pivoted into the second position as shown in FIG. 4, the support plate 78 is moveable upwardly and downwardly. Thus, as carriage 32 is moved linearly with respect to frame 30, support plate 78 moves upwardly and downwardly, i.e., is raised and lowered, by virtue of engagement of cam surface 85 of pattern plate 80 with follower 86 fixed on frame 30. As a result, a workpiece mounted on lathe 50 is raised and lowered with respect to table saw blade 25 as dictated by pattern plate 80. Upward and downward movement of support plate 78 with respect to carriage 32 is facilitated by a pair of toothed racks 90 (FIG. 11) on support plate 78 that engage pinions 92 mounted on an axle 93 journaled through end plates 74 and 75.

Depth of cut can be adjusted by rotating wheel 100 to turn screw shaft 102 and thereby effect movement of nut 104 which in turn operates on linkage 106, 107 and 108 to raise or lower pattern plate 80 with respect to support plate 78 when cam surface 85 is engaged with cam follower 86.

In accordance with another aspect of this invention, a router platen 110 (FIGS. 2 and 3) may be mounted on lathe 50 to facilitate routing of a workpiece. The upper surface of router platen 110 includes a transparent portion 112 having an elongate slot 114. An elongate groove 116 parallel with the elongate slot 114 provides a guide for a routing tool 120. Attached to the lower end of routing tool 120 is a slide plate 122 having on its underside an elongate tongue 124 adapted to be received snugly in guide groove 116, whereby router tool 120 can be moved linearly between adjustable stops 130 and 132.

The height of router platen 110 and the angle of router platen 110 with respect to lathe 50 is adjustable in the illustrated embodiment.

Figure 6:
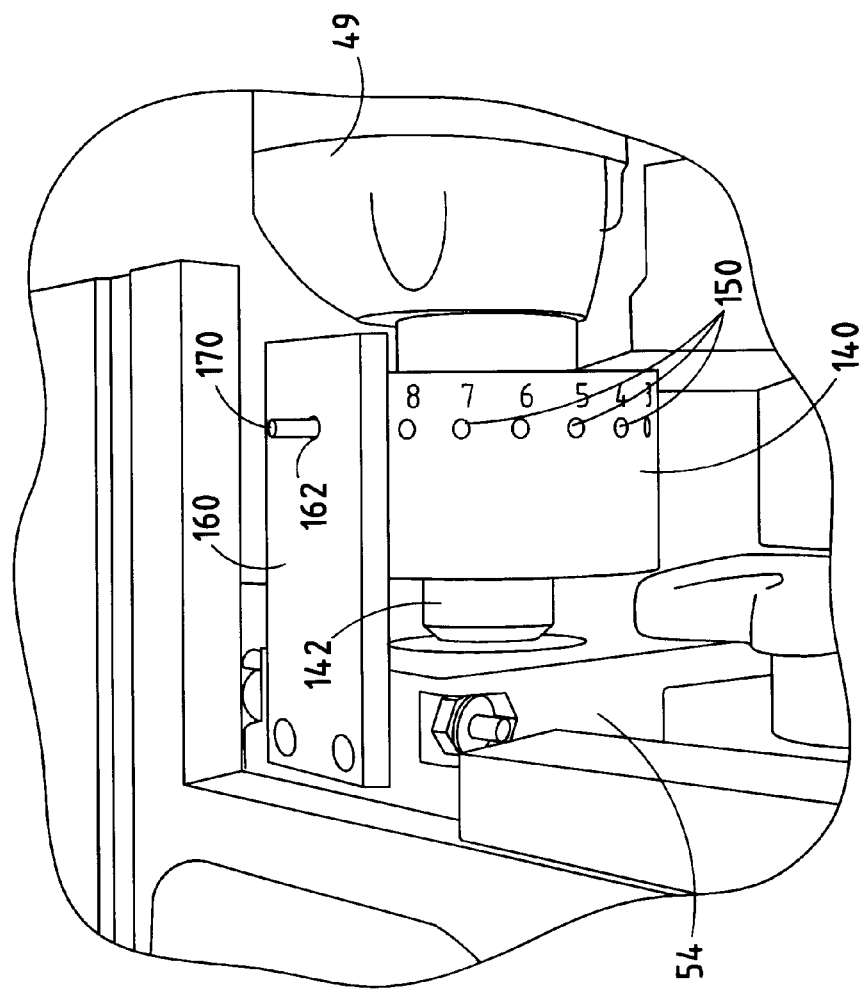
FIG. 6 is a perspective view of an indexing collar for holding a workpiece in a fixed angular orientation on a lathe.

An indexing collar 140 (FIG. 6) on chuck 142 of drill 49 is useful in combination with router platen 110 to fix the rotational position of a workpiece with respect to the router platen. Collar 140 includes a plurality of angularly spaced apart indexing holes 150. The illustrated collar 140 includes 24 indexing holes 150 that are equally spaced apart by 15 degrees. A reference stop 160 having a pinhole 162 is attached to headstock 54, and a pin 170 is inserted through pinhole 162 and one of indexing holes 150 of collar 140 to fix the orientation of a workpiece supported on lathe 50. Collar 140 may be provided with a hinge (not shown), whereby collar 140 can be mounted on chuck 142 without removing drill 49 from drill stand assembly 48 and without detaching spindle 55 from drill chuck 142.

If desired, a lathe tool rest may be mounted to bed 52 of lathe 50 for manual lathing using a handheld lathing tool.

Transparent safety shield 200 may be added to prevent sawdust from being projected toward the operator and to prevent contact with blade 25.

In one aspect, the invention provides a highly flexible system for converting a table saw into a lathing apparatus and/or a routing apparatus, in which the individual components may be sold and utilized separately or together. For example, the lathe and carriage assembly may be purchased and used with a table saw for lathing operations, and the router platen may be subsequently purchased if the ability to perform routing operations is later desired. Also, the lathe and the router platen may be used together without a table saw by mounting the lathe on a suitable base if it is desired to perform only routing operations, or if it is desired to perform lathing operations with handheld tools rather than with a rotating circular saw blade.

The above description is considered that of the preferred embodiment(s) only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A woodworking apparatus comprising:
   a structure supporting a circular saw blade;
   a carriage mounted on the structure for linear movement relative to the blade;
   a support pivotally connected to the carriage to facilitate pivoting of the support with respect to the carriage around an axis that is parallel with the direction of linear movement of the carriage relative to the circular saw blade; and
   a lathe mounted on the support, the lathe including a headstock and a tailstock for rotatably supporting a workpiece in proximity to the blade, the support being pivotable between a first orientation in which a workpiece supported on the lathe is remote from the blade to facilitate operations on the workpiece with a tool implement other than the blade and a second orientation in which a workpiece supported on the lathe is in proximity to the blade to facilitate operations on the workpiece with the blade.

2. The apparatus of claim 1, wherein the structure supporting the circular saw blade is a table having a table top defining at least one miter groove; and wherein the carriage is slidably mounted on a frame, the frame having at least one mounting rail receivable in the miter groove of the table top to facilitate releasable attachment of the frame to the table top.

3. The woodworking apparatus of claim 1, further comprising a router platen releasably supported on the carriage, the router platen including an upper surface for supporting a router, and an elongate slot defined in the router platen through which a router tool may project from the router to a workpiece supportable on the lathe.

4. A woodworking apparatus comprising:
   a structure supporting a circular saw blade;
   a carriage mounted on the structure for linear movement relative to the blade;
   a support mounted on the carriage to allow linear movement of the support relative to the carriage in a direction that is orthogonal to a line parallel with the direction of allowed movement of the carriage relative to the frame;
   a lathe mounted on the support, the lathe including a headstock and a tailstock for rotatably supporting a workpiece in proximity to a blade of a table saw when the apparatus is mounted on a table saw;
   a pattern releasably attached to the support, the pattern having a cam surface; and
   a follower mounted on the structure and configured to engage the cam surface of the pattern, whereby linear movement of the carriage with respect to the structure will effect concurrent linear movement of the support and lathe relative to the carriage in the direction that is orthogonal to a line parallel with the direction of allowed movement of the carriage relative to the structure, the magnitude and direction of the movement of the carriage and the lathe with respect to the structure being determined by the cam surface of the pattern.

5. The apparatus of claim 4, wherein the structure supporting the circular saw blade is a table having a table top defining at least one miter groove; and wherein the carriage is slidably mounted on a frame, the frame having at least one mounting rail receivable in the miter groove of the table top to facilitate releasable attachment of the frame and lathe to the table top.

6. The woodworking apparatus of claim 4, further comprising a router platen releasably supported on the carriage, the router platen including an upper surface for supporting a router, and an elongate slot defined in the router platen through which a router tool may project from the router to a workpiece supportable on the lathe.

7. A woodworking apparatus comprising:
   a lathe including a headstock and a tailstock for rotatably supporting a workpiece; and
   a router platen supported above the lathe, the router platen including a upper surface for supporting a router, and an elongate slot defined in the router platen through which a router tool may project from the router to a workpiece supportable on the lathe, the router being linearly moveable with respect to the platen along the length of the elongate slot.

8. The workworking apparatus of claim 7, wherein the lathe includes a lathe driver having an indexing collar including means for fixing the rotational position of a workpiece on the lathe with respect to the router platen.

9. A woodworking apparatus comprising:
   a frame;
   a carriage mounted on the frame to allow linear movement of the carriage relative to the frame;
   a lathe mounted on the carriage, the lathe including a headstock and a tailstock for rotatably supporting a workpiece in proximity to a blade on a table saw; and
   at least one rail attached to the frame, the rail configured to be received in a miter groove defined in an upper surface of the top of a table saw, whereby the frame is releasably securable to a table saw.

* * * * *